United States Patent [19]
VanderMeer et al.

[11] Patent Number: 5,310,307
[45] Date of Patent: May 10, 1994

[54] DEPALLETIZING DEVICE AND METHOD

[75] Inventors: Richard H. VanderMeer; Donald J. Simkowski, both of Loveland, Colo.

[73] Assignee: Goldco Industries, Inc., Loveland, Colo.

[21] Appl. No.: 16,969

[22] Filed: Feb. 12, 1993

[51] Int. Cl.⁵ .............................. B65G 39/00
[52] U.S. Cl. .................. 414/796.2; 414/796.8; 414/797.2
[58] Field of Search ............ 198/796.2, 796.8, 797.2

[56] References Cited

U.S. PATENT DOCUMENTS

| | | | |
|---|---|---|---|
| 3,180,499 | 4/1965 | Wildheim et al. | 414/796.8 |
| 3,200,969 | 8/1965 | Madden . | |
| 3,389,810 | 6/1968 | Wolfe et al. . | |
| 3,543,949 | 12/1970 | Weier | 414/796.8 |
| 3,788,497 | 1/1974 | Carlson . | |
| 3,934,713 | 1/1976 | VanderMeer et al. . | |
| 4,358,236 | 11/1982 | Dudley . | |
| 4,759,673 | 7/1988 | Pearce et al. . | |
| 4,809,965 | 3/1989 | VanderMeer et al. | 414/789.5 X |
| 4,978,275 | 12/1990 | Reid et al. | 414/789.5 |

FOREIGN PATENT DOCUMENTS

| | | | |
|---|---|---|---|
| 2223782 | 11/1973 | Fed. Rep. of Germany ... | 414/796.2 |
| 0163212 | 6/1990 | Japan | 414/796.2 |

Primary Examiner—D. Glenn Dayoan
Assistant Examiner—Cheryl L. Gastineau
Attorney, Agent, or Firm—Robert E. Harris

[57] ABSTRACT

A device and method are disclosed for moving articles, such as cans, by groups, or tiers, from a pallet to an adjoining surface, such as a belt conveyor. A pair of sweep arms of a sweep unit move about a closed loop path to alternately engage the trailing portion of groups of articles when at a pallet sweep area to urge each group from the pallet. A pivotable retainer arm of a retainer unit, mounted on a reciprocating carriage moved by a driver following a closed loop path, engages the leading portion of the group of articles to be then moved from the pallet and thereafter leads the group from the pallet. The sweep and retainer arms are simultaneously moved by cycles whereby the sweep arms are alternately moved from a home position to engage the trailing portion of a group of articles and urge the engaged group from the pallet and the retainer arm is moved from a home position in a direction opposite to movement of the sweep arm to engage the leading portion of the group of articles with the retaining arm being thereafter moved in unison with the sweep arm to lead the group from the pallet.

26 Claims, 5 Drawing Sheets

Fig-1

Fig_3

Fig_4

Fig_6

Fig_7

Fig_8A

Fig_8B

Fig_8C

Fig_8D

DEPALLETIZING DEVICE AND METHOD

FIELD OF THE INVENTION

This invention relates to a depalletizing device and method, and, more particularly relates to a device and method for moving articles by groups, or tiers, from a pallet.

BACKGROUND OF THE INVENTION

It is oftentimes necessary to move articles by groups from a particular location, including moving cylindrical articles, such as cans, by tiers from a pallet having a plurality of tiers vertically stacked on top of one another.

It is well known that articles can be moved onto a pallet from an adjacent surface, and that such movement can be effected by a movable arm urging the articles onto the pallet (see, for example, U.S. Pat. Nos. 3,934,713 and 4,978,275).

It is also well known that articles can be moved by tiers from a pallet onto a conveyor surface, and it is likewise well known that such movement can be effected by a movable arm pushing the articles from the pallet (see, for example, U.S. Pat. No. 3,389,810).

SUMMARY OF THE INVENTION

This invention provides a device and method for moving articles by groups, or tiers, from a pallet to an adjoining surface, such as a conveyor belt.

Articles on a pallet are moved from the pallet by groups, or tiers, by causing a sweep arm and a retainer arm to engage the leading and trailing portions, respectively, of the group of articles then to be moved, and then moving the sweep arm and retainer arm in unison so that the sweep arm urges the then engaged group of articles from the pallet and the retainer arm leads the articles from the pallet.

A pair of sweep arms can be effectively utilized, and the sweep arms move about a closed loop path to alternately engage the trailing portion of different groups of articles when at the pallet sweep area to urge each group from the pallet. The retainer arm is preferably pivotably mounted on a carriage moved in opposite directions parallel to the direction of intended movement of articles in being moved from the pallet by a driver following a closed loop path.

The sweep arm, or arms, and the retainer arm are actuated by cycles of operation so that, during each cycle, a sweep arm is moved from a home position to engage the trailing portion of a group of articles at the pallet sweep area and urge the engaged group from the pallet and the retainer arm is moved simultaneously with movement of the sweep arm from the home position in a direction opposite to movement of the sweep arm to engage the leading portion of the group of articles, after which the retainer arm is moved in unison with the sweep arm to lead the group from the pallet. The retaining arm is preferably pivoted out of article engagement to thereby terminate leading of the group of articles and is thereafter pivoted from the article non-engagable position to the article engagable position prior to the retainer arm reaching the home position at the end of each cycle of operation.

The sweep arm urging the group of articles from the pallet is swung from the down position engaging the group of articles to an up position as the sweep arm is moved about the closed loop path to thereby terminate urging of the group of articles from the pallet after all of the articles of the group have been urged from the pallet, and the second sweep arm is then preferably moved to the home position at the end of the cycle of operation.

It is therefore an object of this invention to provide an improved device and method for moving articles by groups from a pallet.

It is another object of this invention to provide an improved device and method for moving articles by groups from a pallet by contacting both the leading and trailing portions of the group and urging the group from the pallet.

It is still another object of this invention to provide an improved device and method for moving articles by groups from a pallet using a sweep arm to contact the trailing portion of the group to urge the articles from the pallet and a retainer arm to contact the leading portion of the group to lead the articles from the pallet.

It is still another object of this invention to provide an improved device for moving articles by groups from a pallet with the device including actuating means for causing movement of a sweep arm in one direction so that the sweep arm engages the trailing portion of the group of articles, causing movement of the retainer arm in the direction opposite to said one direction so that the retainer arm engages the leading portion of the group of articles, and then causing the sweep arm and the retainer arm to be moved in said one direction so that the sweep arm urges the group of articles from the pallet and the retainer arm leads the group of articles from the pallet.

It is yet another object of this invention to provide an improved device for moving articles by groups from a pallet that includes a retainer arm that is moved in the direction opposite to the intended direction of travel of articles in being moved from the pallet to engage the leading portion of the group of articles and is thereafter moved in the intended direction of travel of the group to lead the group from the pallet.

It is still another object of this invention to provide an improved device for moving articles by groups from a pallet that includes a retainer arm that is pivoted out of article engagement to terminate leading of a group of articles from a pallet during each cycle of operation and is later pivoted to an article engaging position prior to the retainer arm reaching the home position at the end of each cycle of operation.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
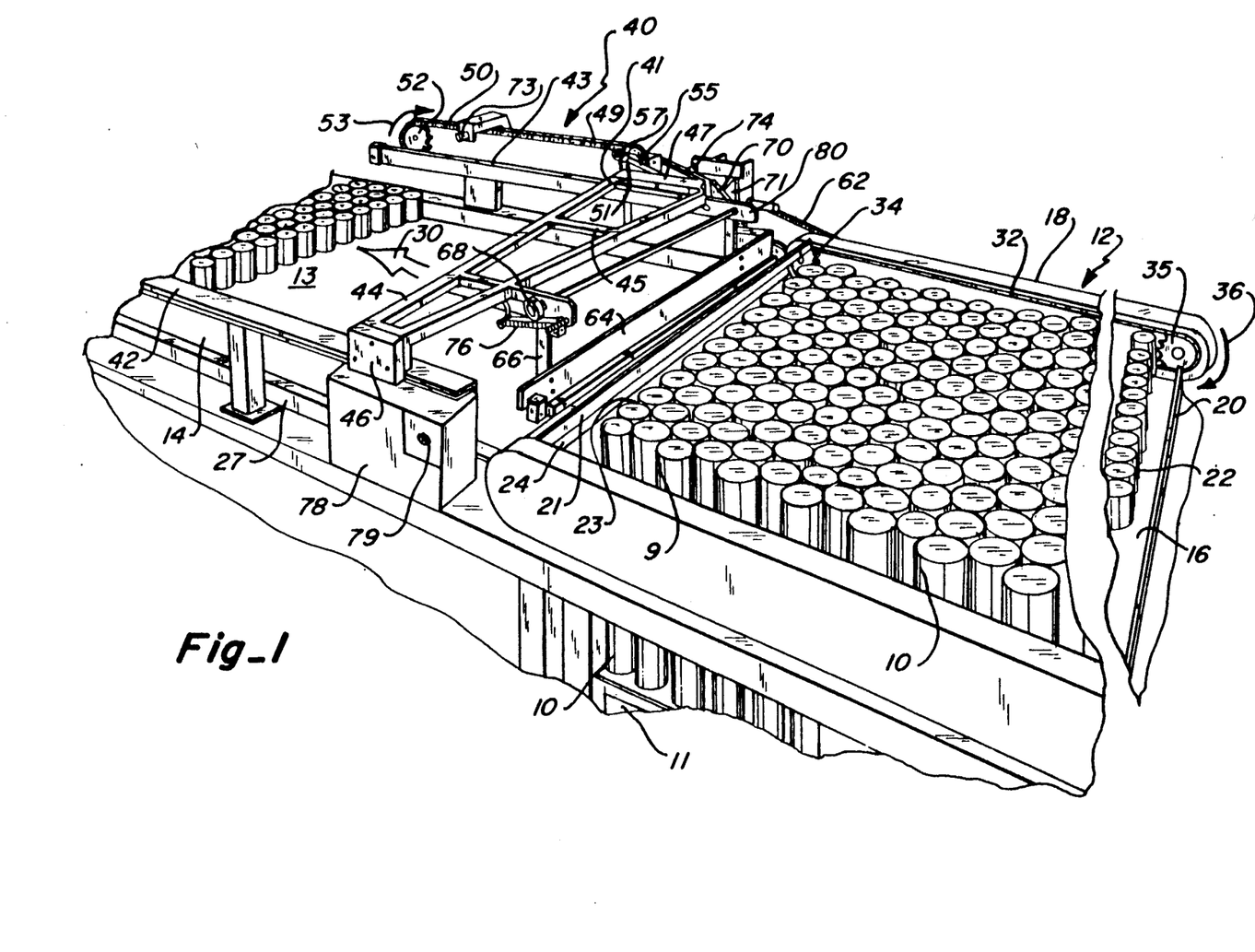
FIG. 1 is a partial perspective view illustrating the device of this invention.

As best shown in FIG. 1, cylindrical articles, such as cans 9, are moved by groups, or tiers, 10 from a pallet 11 at pallet sweep area 12 to an adjacent surface, such as top surface 13 of belt conveyor 14. Pallet 11 normally has a plurality of tiers 10 of articles, such as cans, stacked vertically on top of one another and each tier is successively moved from the pallet by indexing the pallet upwardly as each tier is removed, as is conventional. A separator sheet 16 is also normally positioned between each tier of cans on the pallet, and the top sheet is removed prior to moving the top tier of cans from the pallet as is also conventional. Removal of each separator sheet 16 may be automatically effected, for example, by equipment such as a sheet transfer device such as shown in U.S. Pat. No. 4,809,965.

As each tier 10 of cans 9 is moved from pallet 11, the tier then to be moved (i.e., the top tier 10 of cans 9 then at pallet sweep area 12, as shown in the drawings) is urged from the pallet by means of a sweep assembly, or unit, 18 having at least one sweep arm (sweep arm 20 as illustrated in FIG. 1, which FIGURE illustrates the use of dual sweep arms 20 and 21, as is preferred) engagable with the trailing, or upstream, portion 22 of tier 11 to thereafter urge movement of the tier in a direction such that the leading, or downstream, portion 23 of the tier is moved across dead plate 24 to top surface 13 of conveyor belt 14. As shown, top surface 13 of endless belt conveyor 14 is movable about rollers 25, mounted for rotation on frame 27 with one roller 25 being conventionally driven by a motor (not shown) through drive belt 29 so that the top surface 13 of the belt conveyor is moved in the downstream direction to move the cans away from the pallet, as indicated in FIG. 1 by arrow 30.

Figure 2:
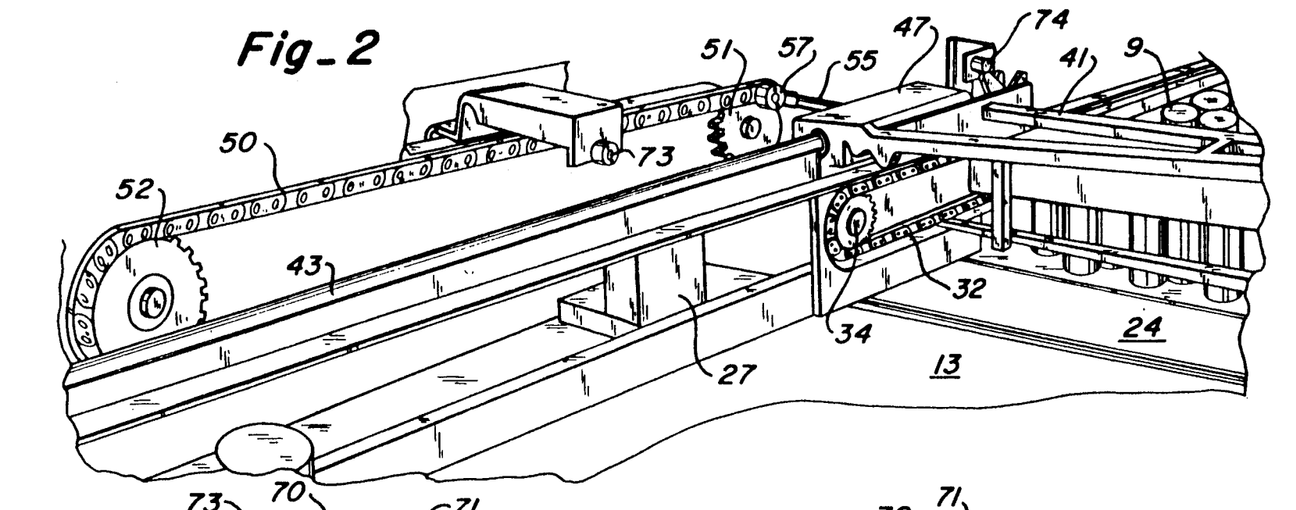
FIG. 2 is a second partial perspective view illustrating the device shown in FIG. 1.

As illustrated in FIGS. 1 and 2, sweep arms 20 and 21 are mounted on an endless chain 32 wrapped about sprockets 34 and 35 so that the sweep arms follow a closed loop path and the sweep arms are spaced from one another so that the sweep arms are alternately brought into engagement with the trailing portion, or row, 22 of successive tiers of cans to be moved from the pallet at pallet sweep area 12. As indicated by arrow 36, chain 32 is driven to move the sweep arms in the downstream direction through the pallet sweep area to urge the cans off of the pallet toward adjacent surface 13. Sprocket 35 is driven by motor 38 through drive 39.

Chain 32 is of sufficient length such that sweep arms 20 and 21 are spaced along the chain so that the sweep arms are alternately brought to the home position as the chain is rotated one-half of the distance around the closed loop path of the sweep arms. As shown in FIG. 1, sweep arm 20 is at the home position, and, as indicated, the sweep arm is downwardly extending and is adjacent to, but spaced from (normally about three inches), the trailing portion of the tier 10 then at the pallet sweep area.

Figure 3:
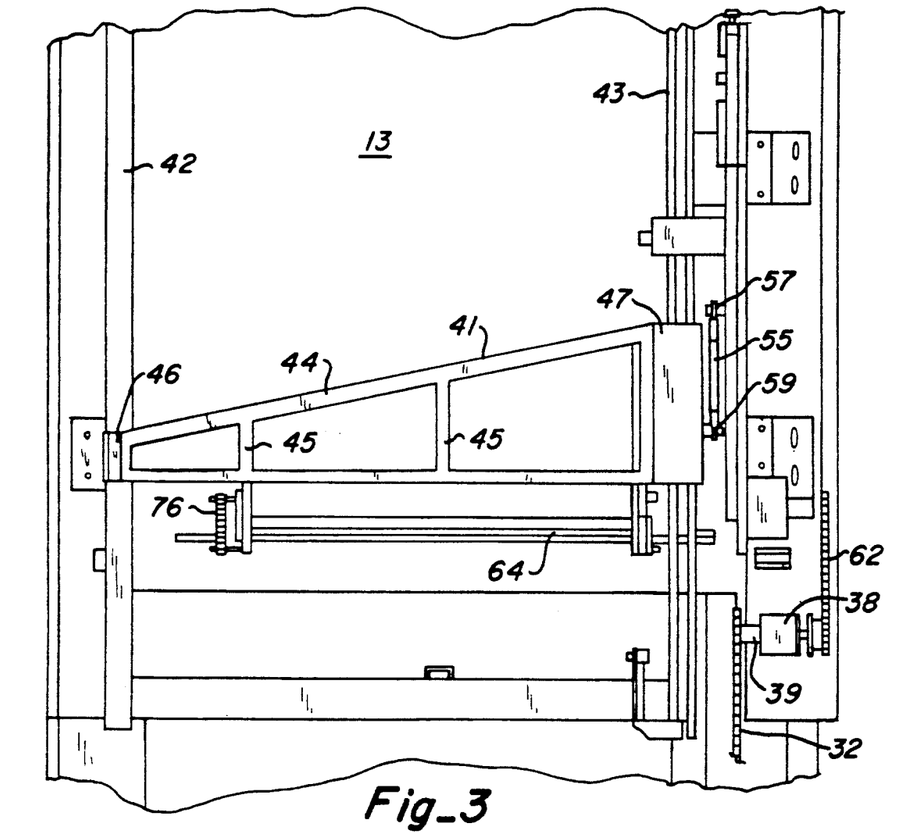
FIG. 3 is a partial top end view of the device shown in FIGS. 1 and 2.
Figure 4:
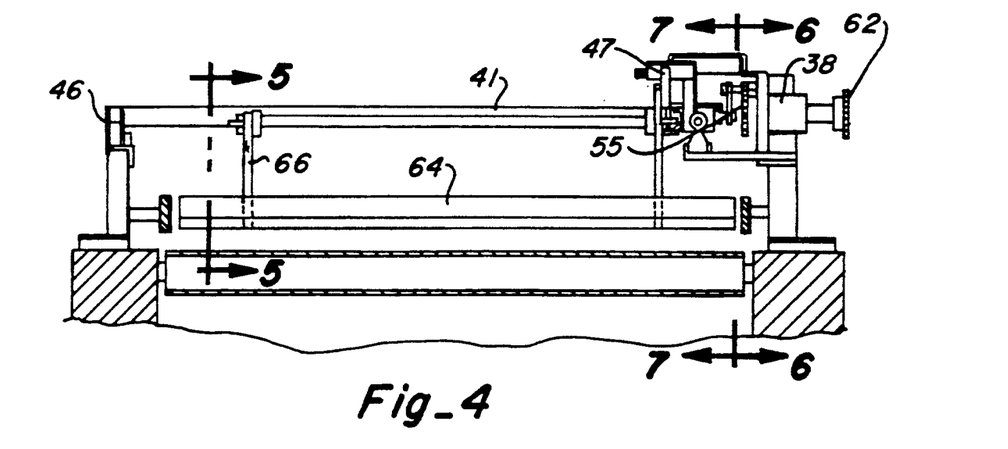
FIG. 4 is an end view of the device shown in FIGS. 1 through 3.

Retainer assembly, or unit 40 is utilized to lead each tier 10 of cans 9 moved from pallet 11 to adjoining surface 13. As illustrated, retainer unit 40 includes a carriage unit 41 movable along guides 42 and 43 mounted on frame 27 so that the carriage unit moves back and forth above top surface 13 of belt 14 in opposite directions parallel to the direction of movement of the top surface of the belt (and hence parallel to the direction of intended movement of each group of articles in being moved from the pallet). As best shown in FIGS. 1, 3 and 4, carriage unit 41 includes frame bars 44 and support bars 45 with frame bars 44 extending at opposite ends to slides 46 and 47 received at guide rods 42 and 43, respectively.

Figure 6:
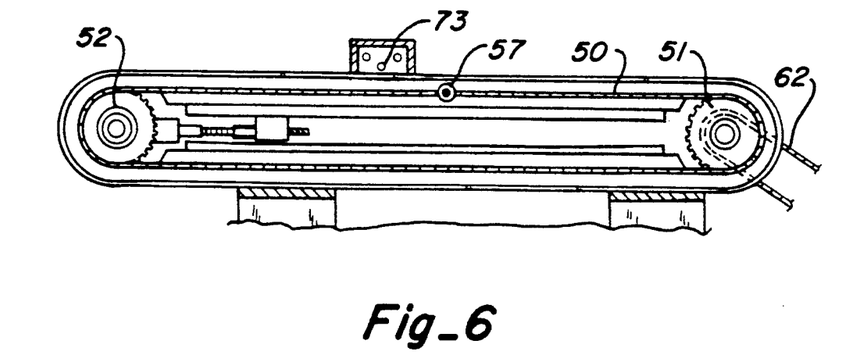
FIG. 6 is a section view taken through lines 6—6 of FIG. 4.
Figure 7:
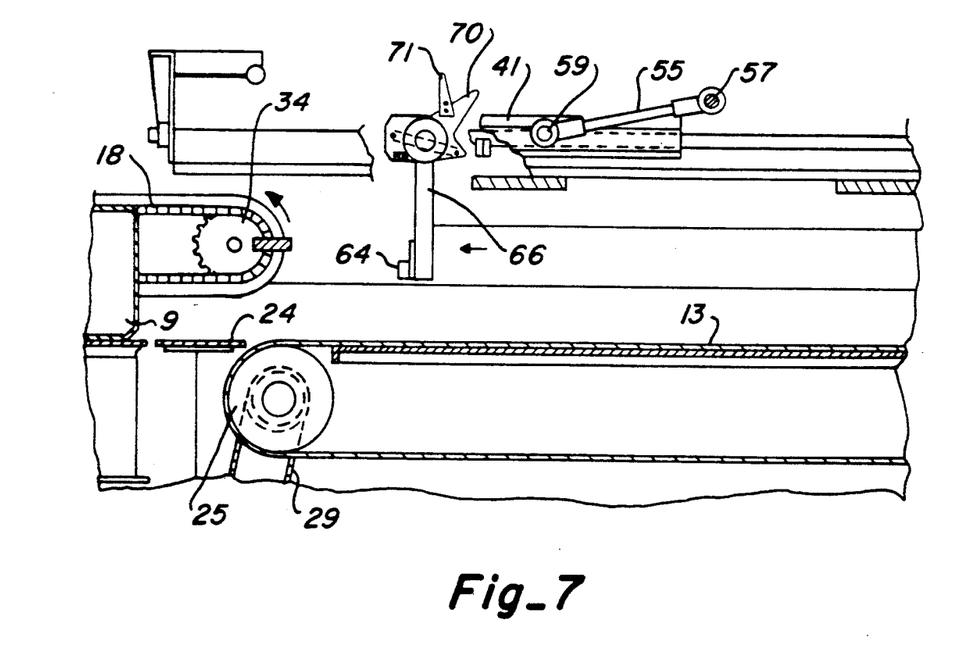
FIG. 7 is a section view taken through lines 7—7 of FIG. 4.

Carriage drive assembly 49, as best shown in FIG. 6, causes movement of the carriage unit back and forth. Carriage drive assembly 49 includes a chain 50 mounted on sprockets 51 and 52 so that the chain follows a closed loop path with the chain being moved in the direction as indicated by arrow 53. As best shown in FIGS. 1 and 7, a connector arm 55, such as a Pitmans arm, is mounted at one end 57 on chain 50 and connector arm 55 extends to and is mounted at end 59 on carriage unit 41 to impart movement to the carriage unit when the chain is moved. Chain 50 of drive assembly 49 is preferably actuated by motor 38 through belt drive 62 (alternately, chain 50 may be separately driven so that both chains 32 and 50 are moved at the same speed, and, also alternately, chains 32 and 50 could be commonly driven with conveyor belt 14 to assure that the retainer and sweep arms move at the same speed with the conveyor belt moving at a slightly less speed).

As indicated in FIG. 1, retainer unit 40 is normally in the home position between cycles of operation. In this position, end 57 of connector arm 55 is positioned at the top of the closed loop path of chain 50 and is adjacent to sprocket 51. When chain 50 is moved from the home position, connector arm 55 initially moves carriage unit 41 toward pallet 11 until the chain has moved a sufficient distance to thereafter move carriage unit 41 in the opposite direction by continued movement of the chain about sprocket 51 (this distance of movement is equal to the distance between sweep arm 20 and the trailing portion of a tier of cans at the pallet sweep area when the sweep unit is at the home position).

Chain 50 is rotated twice about its closed loop path each time that chain 32 moves once around its closed loop path. This is preferably achieved by chain 50 being one-half as long as chain 32 and driving the chains at the same speed.

Retainer arm 64 is mounted on frame bars 45 of carriage unit 41 by retainer support arm 66 so that retainer arm 64 is moved back and forth in a straight line path along with movement of carriage unit 41 so that retainer arm 64 is adjacent to and spaced from leading portion 23 of a tier of cans at pallet sweep area 12 when retainer unit 40 is in the home position (the spacing between retaining arm 64 and leading portion 23 of the tier of cans being a distance equal to that of the spacing between sweep arm 20 and trailing portion 22 of a tier of cans at the pallet sweep area when sweep unit 18 is in the home position).

Thus, when retaining unit 40 is moved from the home position, the initial movement of retaining arm 64 is in a direction opposite to the intended direction of movement of cans 9 from pallet sweep area 12 at pallet 13 to the upper surface 13 of conveyor belt 14. This allows the retaining arm to be brought into engagement with the leading portion of the tier of cans to be then moved from the pallet sweep area as a sweep arm is brought into engagement with the trailing portion of the tier, after which the sweep arm and retaining arm are moved in unison so that as the sweep arm urges the engaged tier from the pallet sweep area and the retaining arm leads the engaged tier from the pallet sweep area.

Figure 5A:
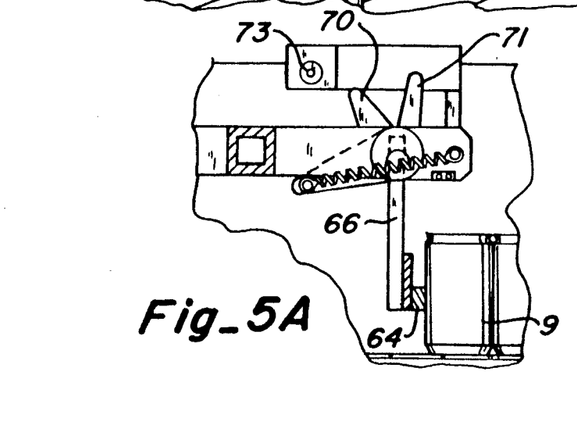
FIG. 5A is a partial section view taken through lines 5—5 of FIG. 4 illustrating the retainer arm in the down position.
Figure 5B:
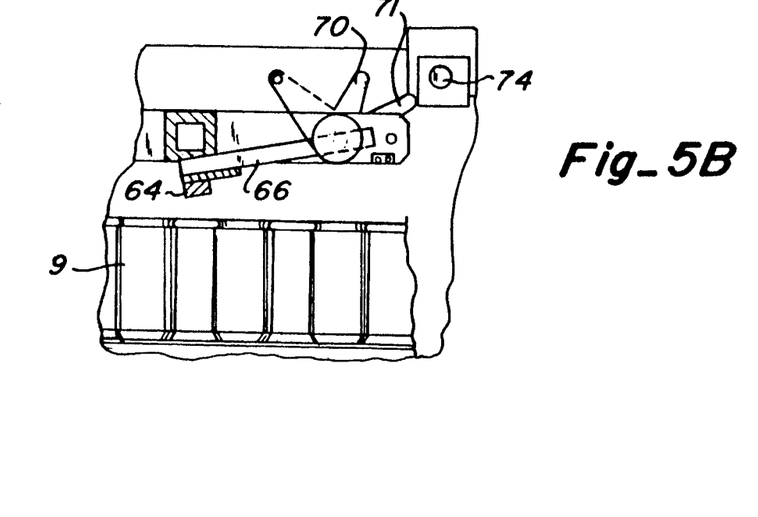
FIG. 5B is a partial section view similar to that of FIG. 5A but illustrating the retainer arm in the up position.

As indicated, arm 64 is pivotable about pivot 68 mounted on carriage unit 41. Pivoting is effected by ears 70 and 71 mounted on retainer support arm 66 to cause pivoting of support arm 66 in opposite directions to cause retaining arm 64 to be pivoted downwardly upon actuation of ear 70 (from the upstanding position as shown in FIG. 5A) so that retainer arm 64 is engagable with the leading portion of the tier of cans then at the pallet sweep area, and to cause retainer arm 64 to be pivoted upwardly upon actuation of ear 71 (from the upstanding position as shown in FIG. 5B) so that retainer arm 64 is in an article non-engagable position (i.e. out of the path of travel of the tier of cans being urged from the pallet sweep area by a sweep arm).

Cams 73 and 74 are mounted on frame 27 so that the then upwardly extending ear contacts the cams to cause pivoting of support arm 66 (a spring 76 is connected between support arm 66 and carriage unit 41 to facilitate pivoting of support arm 66 between the up and down positions).

Cam 73 is positioned to engage ear 71 when the carriage unit is near the downstream end 80 of guide 42 and 43 to cause support arm 66 to be pivoted upwardly to cause retainer arm 64 to be pivoted upwardly out of engagement with the leading portion of a tier of cans being then removed from the pallet to thus terminate leading of the group by the retainer arm. Cam 74 is positioned to engage ear 70 when the carriage is being returned to the home position after chain 50 has been moved a sufficient distance such that end 57 of connector rod 55 is on the upper surface of the closed loop path to cause carriage unit 41 to be moved in the direction toward the pallet with retainer arm 64 being in the up position (out of the path of travel of cans). Engagement of ear 70 with cam 74 causes support arm 66 to be pivoted downwardly to return retainer arm 64 to the down position just prior to chain 50 reaching the home position.

Figure 8A:
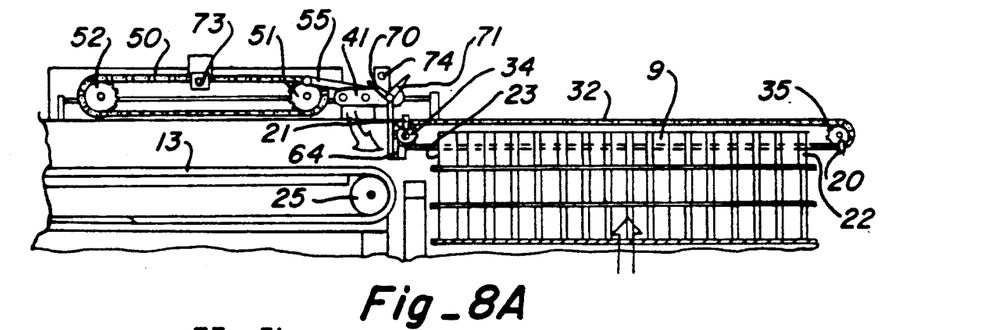
FIGS. 8A through 8D are partial side views illustrating operation of this invention.

FIGS. 8A through 8D illustrate a cycle of operation. The home position of the device is illustrated in FIG. 8A. In the home position, one sweep arm (arm 20 as illustrated in FIG. 8A) is adjacent to the trailing portion of a tier of cans to be then engaged and moved from the pallet sweep area and retainer arm 64 is in the article engagable (down) position and adjacent to the leading portion of a tier of cans to be then engaged and moved from the pallet sweep area.

Figure 8B:
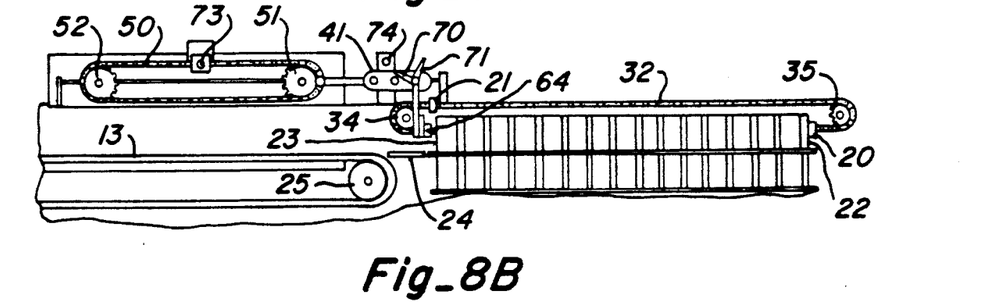

The start of each cycle can be automatically controlled by controller 78 and/or can be initiated by start button 79 at controller 78. At the start of the cycle (each cycle consists of movement of chain 32 of the sweep unit one-half of the distance about its closed loop path and movement of chain 50 entirely about its closed loop path), sweep arm 20 is adjacent to trailing portion 22 of the tier to be then engaged is brought into engagement with the trailing portion of the tier, and retaining arm 64 is brought into engagement with leading portion 23 of the tier to be then engaged, as illustrated in FIG. 8B.

Figure 8C:
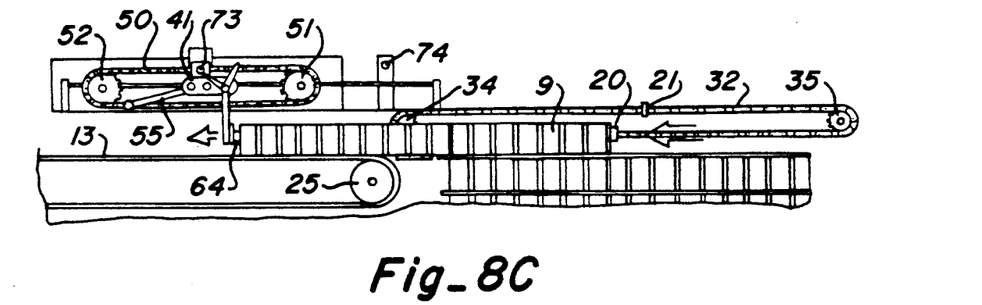

Continued movement of chains 32 and 50 causes the engaged tier of cans to be moved from the pallet sweep area with the sweep arm engaging the trailing portion urging the cans from the pallet toward the adjoining surface and the retaining arm remaining in engagement with the leading portion of the tier and moving in unison with the sweep arm to lead the tier of cans from the pallet sweep area across dead plate 24 to upper surface 13 of moving conveyor belt 14 (the conveyor belt is moved at a slightly slower speed than the speed of the sweep and retaining arms), as illustrated in FIG. 8C.

Figure 8D:
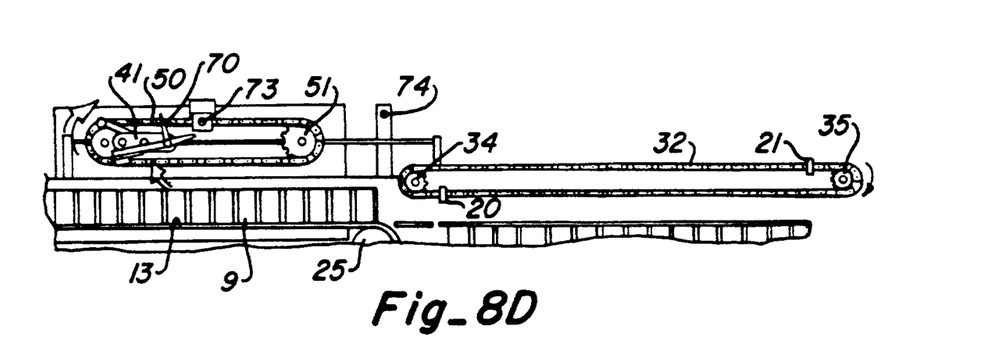

When carriage unit 41 is near the end of guides 42 and 43, upstanding ear 71 contacts cam 73 to pivot support arm 66 and thus pivot retainer arm 64 so that retainer arm 64 is moved upwardly in an arc out of the path of the tier of articles, as illustrated in FIG. 8D, and the tier is continued to be urged by the sweep arm from the pallet sweep area.

After all of the cans have been urged from the pallet sweep area by the sweep arm engaging the trailing portion of the tier, the sweep arm is rotated upwardly by movement of chain 32 about sprocket 34 (as indicated in FIG. 8D), and conveyance of the tier of cans now on conveyor belt 14 is continued to move the cans downstream.

Movement of chains 32 and 50 is continued to move the second sweep arm (arm 21 as illustrated in FIG. 8A) to the home position adjacent to a next tier of cans to be moved from the pallet (sweep arm 20 is now at the position shown for sweep arm 21 in FIG. 8A) and to move carriage unit 41 toward the home position, during which movement upstanding ear 70 is brought into contact with cam 74 to cause support arm 66 to be pivoted downwardly to pivot retainer arm 64 to the down position. The sweep arm and the retaining arm simultaneously reach the home position, and this completes the cycle, after which chain movement is terminated until the start of a new cycle.

The retainer is designed to prevent the leading articles of each tier from tipping over when swept off of the pallet due to: (1) irregular edges on separator sheets; (2) a mismatch in levels between the pallet sweep area and the adjacent surface; (3) increased speeds of operation of the device; (4) handling lighter weight articles; (5) handling unstable articles due to bottom configuration; and (6) elimination of the need to leave articles on the dead plate to prevent article tipping.

In view of the foregoing, it is to be appreciated that this invention provides an improved device and method for depalletizing.

What is claimed is:

1. A depalletizing device for moving articles by groups from a pallet with each said group of articles having a leading portion and a trailing portion, said device comprising:
   sweep means having movable article urging means engagable with the trailing portion of a group of articles then at a pallet sweep area, said article urging means being at a home position that is adjacent to but spaced from said trailing portion of said group of articles then at said pallet sweep area prior to engagement with said trailing portion;
   retainer means having movable article retaining means engagable with the leading portion of said group of articles then at said pallet sweep area; and actuating means connected with said sweep means and said retainer means for causing movement of said article urging means from the home position whereby said article urging means thereafter engages said trailing portion of said group of articles and thereafter urges said group of articles from said pallet in a predetermined direction, said actuating means also causing movement of said article retaining means whereby said article retaining means engages said leading portion of said group of articles and thereafter leads said group of articles from said pallet as said group of articles is moved from said pallet in said predetermined direction by said article urging means.

2. The device of claim 1 wherein said article urging means includes a sweep arm positioned adjacent to said trailing portion of said group of articles when in said home position prior to engagement with said trailing portion of said group of articles with said sweep arm being moved from the home position into engagement with said trailing portion of said group of articles and thereafter being further moved to urge said engaged group of articles from said pallet in said predetermined direction.

3. The device of claim 2 wherein said sweep means includes a second sweep arm and drive means connected with said sweep arms so that said sweep arms are driven in a closed loop path and spaced with respect to one another along said closed loop path to alternately be brought to said home position and later moved therefrom to alternately engage the trailing portions of groups of articles successively positioned at said pallet sweep area.

4. The device of claim 1 wherein said article retaining means includes a retainer arm positioned adjacent to said leading portion of said group of articles when in a home position prior to engagement with said leading portion of said group of articles with said retainer arm being moved from the home position into engagement with said leading portion of said group of articles and thereafter being further moved to lead said engaged group of articles from said pallet as said group of articles are urged from said pallet by said article urging means.

5. The device of claim 4 wherein said retainer means includes movable carriage means having said retainer arm mounted thereon so that said retainer arm is movable in opposite directions substantially parallel to said predetermined direction of movement of said group of articles when urged from said pallet by said article urging means.

6. The device of claim 5 wherein said retainer arm is pivotably mounted on said carriage means for movement between an article engagable position and an article non-engagable position.

7. The device of claim 6 wherein said retainer means includes spring means connected between said retainer arm and said carriage means for urging said retainer means to at least one of said article engagable and article non-engagable positions.

8. A depalletizing device for moving articles by groups from a pallet with each said group of articles having a leading portion and a trailing portion, said device comprising:
sweep means having movable article urging means engagable with the trailing portion of a group articles then at a pallet sweep area;

retainer means having movable article retaining means engagable with the leading portion of said group of articles then at said pallet sweep area, said article retaining means including a retaining arm positioned adjacent to said leading portion of said group of articles when in a home position prior to engagement with said leading portion of said group of articles with said retainer arm being moved from the home position into engagement with said leading portion of said group of articles and thereafter being further moved to lead said engaged groups of articles from said pallet as said group of articles are urged from said pallet by said article urging means, said retainer means including movable carriage means having said retainer arm pivotably mounted thereon with said retainer arm being movable in opposite directions substantially parallel to said predetermined direction of movement of said group of articles when urged from said pallet by said article urging means so that said retainer arm is thereby mounted for movement between an article engageable position and an article non-engageable position, and said retainer means also including pivot control means having first and second portions with said portion being connected with said retainer arm;

actuating means connected with said sweep means and said retainer means for causing movement of said article urging means whereby said article urging means engages said trailing portion of said group of articles and thereafter urges said group of articles from said pallet in a predetermined direction, said actuating means also causing movement of said article retaining means whereby said article retaining means engages said leading portion of said group of articles and thereafter leads said group of articles from said pallet as said group of articles is moved from said pallet in said predetermined direction by said article urging means; and frame means having said carrier means movable relative thereto, said frame means having said second portion of said pivot control means mounted thereon whereby said retainer arm is caused to be pivoted to said article engagable position during one portion of movement of said carriage means to allow engagement of said retainer arm with said leading portion of said group of articles after movement of said retainer arm from said home position, and whereby said retainer arm is caused to be pivoted to said article non-engagable position during another portion of movement of said carriage means to facilitate return of said retainer arm to said home position.

9. A depalletizing device for moving articles by groups from a pallet with each said group of articles having a leading portion and a trailing portion, said device comprising:
sweep means having movable article urging means engagable with the trailing portion of a group of articles then at a pallet sweep area;
retainer means having movable article retaining means engagable with the leading portion of said group of articles then at said pallet sweep area, said article retaining means including a retainer arm positioned adjacent to said leading portion of said group of articles when in a home position prior to engagement with said leading portion of said group of articles with said retainer arm being moved from the home position into engagement with said leading portion of said group of articles and thereafter being further moved to lead said engaged group of articles from said pallet as said group of articles are urged from said pallet by said article urging means, said retainer means including movable carriage means having said retainer arm mounted thereon so that said retainer arm is movable in opposite directions substantially parallel to said predetermined direction of movement of said group of articles when urged from said pallet by said article urging means, said retainer means including drive means having connector means mounted thereon with said connector means being driven in a closed loop path, and said retainer means also including connecting means extending between said connector means and said carriage means whereby said carriage means is driven in opposite directions by said drive means when said connector means is driven through said closed loop path; and actuating means connected with said sweep means and said retainer means for causing movement of said article urging means whereby said article urging means engages said trailing portion of said group of articles and thereafter urges said group of articles from said pallet in a predetermined direction, said actuating means also causes movement of said article retaining means whereby said article retaining means engages said leading portion of said group of articles and thereafter leads said group of articles from said pallet as said group of articles is moved from said pallet in said predetermined direction by said article urging means.

10. A depalletizing device for moving articles by groups from a pallet with each said group of articles having a leading portion and a trailing portion, said device comprising:

sweep means having movable article urging means engagable with the trailing portion of a group of articles then at a pallet sweep area, said sweep means having first drive means movable in a single direction along a first predetermined path;

retainer means having movable article retaining means engagable with the leading portion of said group of articles then at said pallet sweep area, said retainer means having second drive means movable in a single direction along a second predetermined path; and actuating means connected with said first drive means of said sweep means and said second drive means of said retainer means for causing movement of said article urging means whereby said article urging means is caused to be initially moved in said predetermined direction to engage said trailing portion of said group of articles then at said pallet sweep area, said article retaining means is caused to be initially moved in a direction opposite to said predetermined direction to engage said leading portion of said group of articles then at said pallet sweep area, and said article urging means and said article retaining means are then caused to be moved in unison in said predetermined direction to move said group of articles then at said pallet sweep area from said pallet.

11. The device of claim 1 wherein said device includes conveying means adjacent to said pallet for receiving articles urged from said pallet by said sweep means.

12. The device of claim 11 wherein said conveying means is a conveyor belt running at substantially the same speed as said article urging means of said sweep means.

13. A depalletizing device for moving articles by tiers from a pallet in a predetermined direction, said device comprising:

sweep means having first and second movable sweep arms mounted for movement about a closed loop path and spaced from one another along said path so that said sweep arms are alternately engagable with the trailing portions of successive tiers of articles when said tiers are successively positioned at a pallet sweep area;

retainer means having a movable article retainer arm mounted for movement in opposite directions along a path substantially parallel to said predetermined direction of movement of said tiers of articles from said pallet so that said retainer arm is engagable with the leading portions of each said tier of articles when at said pallet sweep area; and actuating means connected with said sweep means and said retainer means for causing movement of said sweep arms of said sweep means and said retainer arm of said retainer means whereby said first sweep arm engages the trailing portion of a first tier of articles when at said pallet sweep area and thereafter urges said first tier from said pallet in said predetermined direction, whereby said retainer arm is caused to engage the leading portion of said first tier of articles and thereafter leads said first tier of articles from said pallet as said first tier of articles is urged from said pallet by said first sweep arm, whereby said second sweep arm engages the trailing portion of a second tier of articles when at said pallet sweep area and thereafter urges said second tier of articles from said pallet in said predetermined direction, and whereby said retainer arm engages the leading portion of said second tier of articles and thereafter leads said second tier of articles from said pallet as said second tier of articles is urged from said pallet by said second sweep arm.

14. The device of claim 13 wherein said sweep means includes drive means for moving said first and second sweep arms in said predetermined direction to engage said trailing portion of each said tier of articles when at said pallet sweep area and to then urge said engaged tier of articles from said pallet, and wherein said retainer means includes drive means for moving said retainer arm in a direction opposite to said predetermined direction to engage said leading portion of each said tier of articles when at said pallet sweep area with said drive means thereafter moving said retainer arm in said predetermined direction to lead each engaged tier of articles from said pallet.

15. The device of claim 14 wherein said drive means of said sweep means includes first closed loop path establishing means connected with said sweep arms for moving said sweep arms about a first closed loop path, wherein said drive means of said retainer means includes carriage means movable in opposite directions parallel to said predetermined direction of movement of said tiers of articles from said pallet with said retainer arm being mounted on said carriage means for movement therewith, wherein said drive means of said retainer means also includes a connector having first and second portions with said first portion being connected with said carriage means, and wherein said drive means of said retainer means further includes second closed loop path establishing means connected with said second portion of said connector and moving said second portion of said connector about a second closed loop path to thereby cause movement of said carriage means in said opposite directions.

16. The device of claim 15 wherein said sweep arms are connected with said first closed loop path establishing means so that each sweep arm moves one-half of the distance of said first closed loop path during movement of each tier of articles from said pallet, and wherein said second portion of said connector is connected with said second closed loop path establishing means so that said second portion of said connector moves entirely about said second closed loop path during movement of each tier of articles from said pallet.

17. The device of claim 15 wherein each of said first and second closed loop path establishing means includes an endless chain movable about spaced sprockets with said endless chain of said first closed loop path establishing means having said sweep arms mounted thereon and said endless chain of said second closed loop path establishing means having said second portion of said connector mounted thereon, said endless chain of said first closed loop path establishing means having a length twice that of said endless chain of said second closed loop path establishing means, and said actuating means being connected with at least one of said sprockets of both of said endless chains to drive said endless chains at the same speed.

18. The device of claim 13 wherein said retainer means includes carriage means and mounting means for mounting said retainer arm on said carriage means so that said retainer arm can be pivoted relative to said carriage means, and said retainer means also including pivot actuating means connected with said retainer arm for enabling said retainer arm to be pivoted between an article engagable position and an article non-engagable position.

19. A method for moving articles by groups from a pallet with each said group of articles having upstream and downstream sides, said method comprising:
commencing a cycle of operation by engaging both the upstream and downstream sides of a group of articles then to be moved from said pallet;
after such engagement, applying force to said upstream side of said group of articles to cause movement of said group of articles in the downstream direction while continuing engagement with the downstream side of said group of articles to thereby lead said group of articles from said pallet;
discontinuing leading of said group of articles after at least said downstream side of said group of articles has been moved from said pallet; and
thereafter continuing application of force to the upstream side of said group of articles until all of the articles in said group have been moved from said pallet.

20. The method of claim 19 wherein said method includes providing a sweep arm and moving said sweep arm in the downstream direction to engage said upstream side of said group of articles, providing a retainer arm and moving said retainer arm upstream to engage the downstream side of said group of articles, and moving the sweep arm and the retainer arm in unison in the downstream direction to move and lead the group of articles from the pallet.

21. The method of claim 20 wherein, prior to commencement of each cycle of operation, a sweep arm is at a home position adjacent to and spaced from the upstream side of a group of articles then to be moved from the pallet and said retainer arm is at a home position adjacent to and spaced from the downstream side of said group of articles then to be moved from the pallet, and wherein said cycle of operation is completed by returning a sweep arm and said retaining arm to the home position.

22. The method of claim 20 wherein said method includes providing first and second sweep arms for alternately engaging the upstream side of different ones of said tiers of articles to be moved from said pallet, and moving said retainer arm into engagement with the downstream side of each of said groups of articles to be moved from said pallet, whereby said first sweep arm and said retainer arm are moved in unison during a first cycle of operation to move a first group of articles from said pallet, and whereby said second sweep arm and said retainer arm are moved in unison during a second cycle of operation to move a second group of articles from said pallet.

23. The method of claim 20 wherein said method includes moving said sweep arm at least partially about a closed loop path during each cycle of operation, and moving said retainer arm in opposite directions parallel to the intended path of said group of articles in being moved from said pallet during each cycle of operation.

24. The method of claim 23 wherein said retainer arm is moved in opposite directions by an applied force moving in a closed loop path.

25. The method of claim 20 wherein said method includes providing a pair of sweep arms and moving each of said sweep arms one-half of the distance about a first closed loop path during each cycle of operation, and providing an applied force moving entirely around a second closed loop path during each cycle of operation with said second closed loop path being one-half of the length of said first closed loop path so that said sweep arms are caused to alternately engage the upstream side of groups of articles to be moved from the pallet and said retainer arm is caused to engage the downstream side of each group of articles to be moved from the pallet.

26. The method of claim 20 wherein said retainer arm is pivoted into an article engagable position prior to commencement of a cycle of operation and is pivoted into an article non-engagable position to terminate leading of a group of articles from said pallet.

* * * * *